Jan. 2, 1923.

J. ROSS.
DIFFERENTIAL FOR MOTOR VEHICLES.
FILED JAN. 16, 1922.

Witness:
Edward T. Wray.

Inventor:
James Ross.
By Parker & Carter
his Attorneys.

Jan. 2, 1923.

J. ROSS.
DIFFERENTIAL FOR MOTOR VEHICLES.
FILED JAN. 16, 1922.

Witness:
Edward T. Wray.

Inventor:
James Ross.
By [signature]
his Attorneys.

Patented Jan. 2, 1923.

1,440,555

UNITED STATES PATENT OFFICE.

JAMES ROSS, OF LAPORTE, INDIANA, ASSIGNOR TO ADVANCE-RUMELY COMPANY, OF LAPORTE, INDIANA, A CORPORATION OF INDIANA.

DIFFERENTIAL FOR MOTOR VEHICLES.

Application filed January 16, 1922. Serial No. 529,587.

*To all whom it may concern:*

Be it known that I, JAMES ROSS, a citizen of the United States, residing at Laporte, in the county of Laporte and State of Indiana, have invented a certain new and useful Improvement in Differentials for Motor Vehicles, of which the following is a specification.

The invention of this application, which is a division of my application Ser. No. 450,814, filed March 9, 1921, relates to improvements in differentials for motor vehicles, particularly for traction engines and similar heavy self-propelled machinery. It has for one object to provide a new and improved form which can be easily and conveniently assembled, rigid in operation, and cheap in cost of construction and repair. Other objects will appear from time to time throughout the specification and claims.

My invention is illustrated more or less diagrammatically in the accompanying drawings, wherein—

Like parts are designated by like characters throughout.

Figure 1:
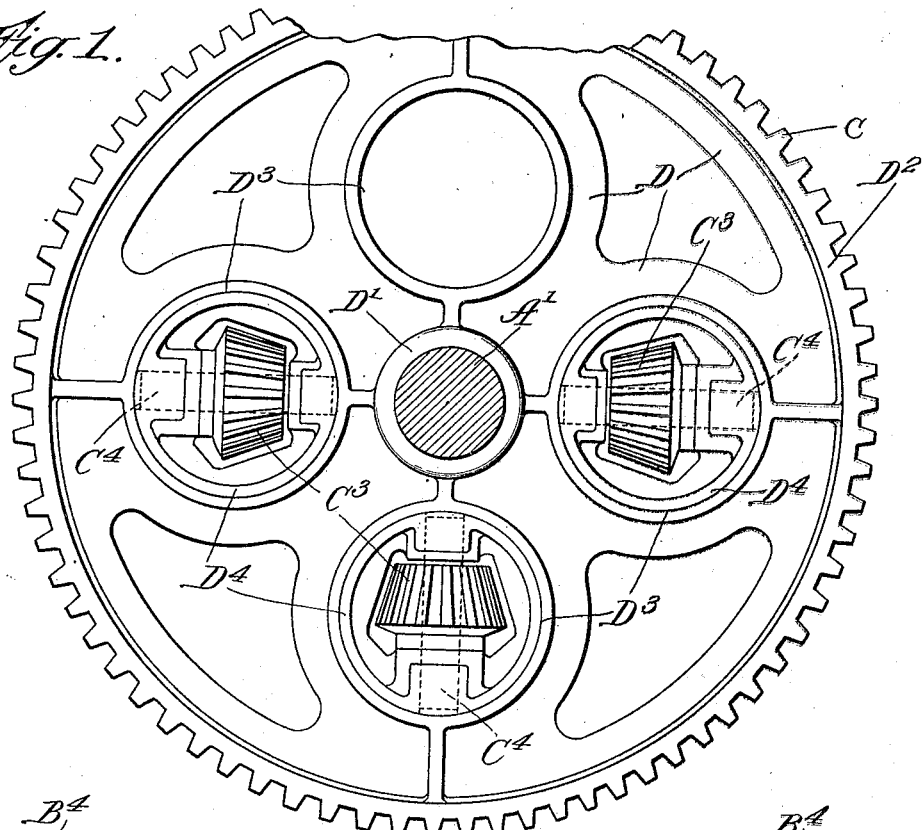
Figure 1 is a plan view with parts broken away.
Figure 3:
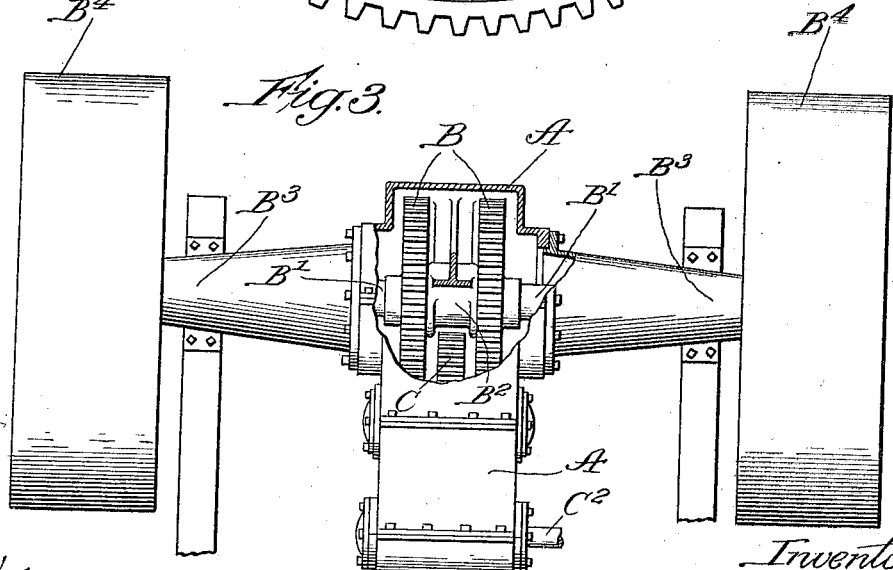
Figure 3 is a diagrammatic plan view of the transmission.
Figure 2:
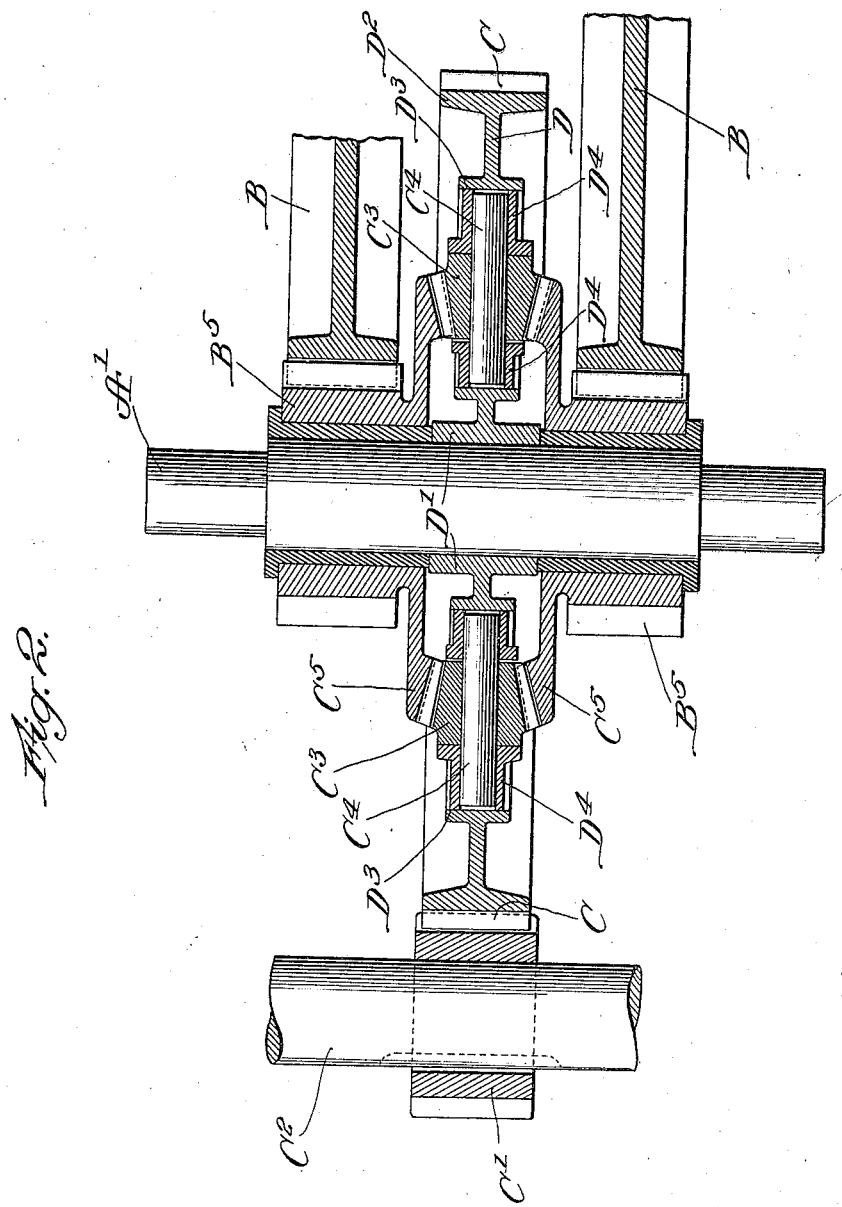
Figure 2 is a vertical section showing in part the differential assembly.

A is a transmission housing in which a differential shaft A' is mounted for rotation in suitable bearings, not here shown since they form no part of the present invention.

B B are master gears rotatably mounted on the stub end axle shafts B' B', the inner ends of these shafts being supported on the bearing B² as indicated. The outboard ends rotatably mounted in bearings B³ carry the traction wheels B⁴. B⁵ B⁵ are driving pinions rotatably mounted on the differential shaft A¹ in mesh with one of the master gears B.

C is a differential gear mounted for rotation on the differential shaft A' in mesh with a driving pinion C' on the shaft C² driven by the engine. C³ C³ are a series of differential pinions mounted for rotation upon the radially disposed pins C⁴ C⁴ in the differentiating gear. C⁵ C⁵ are miter gears arranged on either side of the differential gear and each of them in mesh with all of the pinions C³ C³. These miter gears are integral with the driving gears B⁵ B⁵.

This arrangement makes up the usual type of differential in which as long as resistance to rotation of the two master gears is the same, the pressure exerted by the miter gears on opposed sides of the miter pinions balances and so when the differential gear is rotated, the two miter gears, the driving pinions and the master gears all rotate in unison at the same speed but when pressure on one side becomes greater than on the other, then the differential action takes place owing to the unbalance of the pressure on opposed sides of the miter pinions. Its action is well known in the art and on this we need no further discussion.

The differential gear or planetary carrier comprises preferably a flat plate D projecting outwardly from a hub D' and bounded by the rim D². This plate may be cast integrally or the gear may be built upon it. The plate has a plurality of perforations or apertures D³ in each of which is set the supporting box D⁴. This box is free to rotate within the aperture D³, and in effect floats therein. Its movement in the plane of the gear plate is limited by its contact with the interior walls of the aperture D³, and its movement at right angles to the plane of the gear plate is limited by contact with the miter gears C⁵ C⁵. Thus when the parts of the differential are assembled as shown the supporting boxes are held in position so that there is no excessive movement in the plane parallel to that of the plate and they are also held from movement at right angles to that of the plate so that they cannot fall out of the plate, but are held in operative position by means of the miter gears. In this position, however, they can rotate, and while this rotation will ordinarily be slight, it is sufficient to enable the parts to be self-aligning.

I claim:

1. In a differential gear a plurality of separate pinion boxes, pinions mounted for rotation therein, and means for locking each of said boxes for rotation within said gear.

2. In a differential gear a plurality of separate pinion boxes, pinions mounted for rotation therein, a plurality of perforations in said gears adapted to receive said boxes, said boxes mounted for rotation within said perforations.

3. In a differential gear a plurality of separate pinion boxes, pinions mounted for rotation therein, a plurality of perforations in said gears adapted to receive said boxes, said boxes adapted to rotate independently, each about an axis parallel to the axis of rotation of said gear.

4. In a differential gear a main gear having a plurality of perforations therethrough, a plurality of separate pinion boxes, pinions mounted for rotation therein said pinion boxes adapted to be mounted in the perforations in said gear and adapted to rotate independently therein, and a pair of gears one on either side of said main differential gear adapted to mesh with said pinions and to hold said pinions and pinion boxes in position within said main gear.

5. In a differential gear a main gear having a plurality of perforations therethrough, a plurality of separate pinion boxes, pinions mounted for rotation therein said pinion boxes adapted to be mounted in the perforations in said gear and adapted to rotate independently therein each about an axis parallel to the axis of rotation of said main gear, and a pair of gears one on either side of said main differential gear adapted to mesh with said pinions and to hold said pinions and pinion boxes in position within said main gear.

Signed at Laporte, county of Laporte, and State of Indiana, this 11 day of January, 1922.

JAMES ROSS.